United States Patent [19]

Sharp, Jr.

[11] Patent Number: 5,132,844

[45] Date of Patent: Jul. 21, 1992

[54] LIQUID FILLED KALEIDOSCOPE

[76] Inventor: Evert Sharp, Jr., 766 Lakefield Rd., Ste E, Westlake Village, Calif. 91361

[21] Appl. No.: 793,179

[22] Filed: Nov. 18, 1991

[51] Int. Cl.⁵ .............................................. G02B 23/00
[52] U.S. Cl. .................................................... 359/617
[58] Field of Search ............................. 359/617; 353/2

[56]  References Cited

U.S. PATENT DOCUMENTS

| | | | |
|---|---|---|---|
| 3,748,013 | 7/1973 | Orans | 359/617 |
| 4,740,046 | 4/1988 | MacCarthy | 359/617 |
| 5,029,954 | 7/1991 | Eilrich et al. | 359/617 |

Primary Examiner—Richard A. Wintercorn
Attorney, Agent, or Firm—Rapkin, Gitlin & Moser

[57] ABSTRACT

A novel type of liquid filled kaleidoscope with a dual housing that offers the experience of viewing first, a multiplicity of brilliant and symmetrical patterns visible through the eyehole of the kaleidoscopic instrument and second, a kinetic decoration visible from a vantage outside the kaleidoscope along its entire length. Both these effects are created by the same suspended particles flowing freely in a liquid which fills not only the object cell, but also the adjoining chamber located between the inner casing and the interior wall of the transparent main cylinder. This design also allows the viewer to systematically increase or decrease the number of particles visible in the mirrors, by raising or lowering the distal end of the kaleidoscope thus allowing particles to flow into or out of the object cell and the adjoining area. An optical illusion that there is no mirror chamber inside the kaleidoscope can also be created by the dispersion of the same particles against the backrop of a reflective surface.

16 Claims, 2 Drawing Sheets

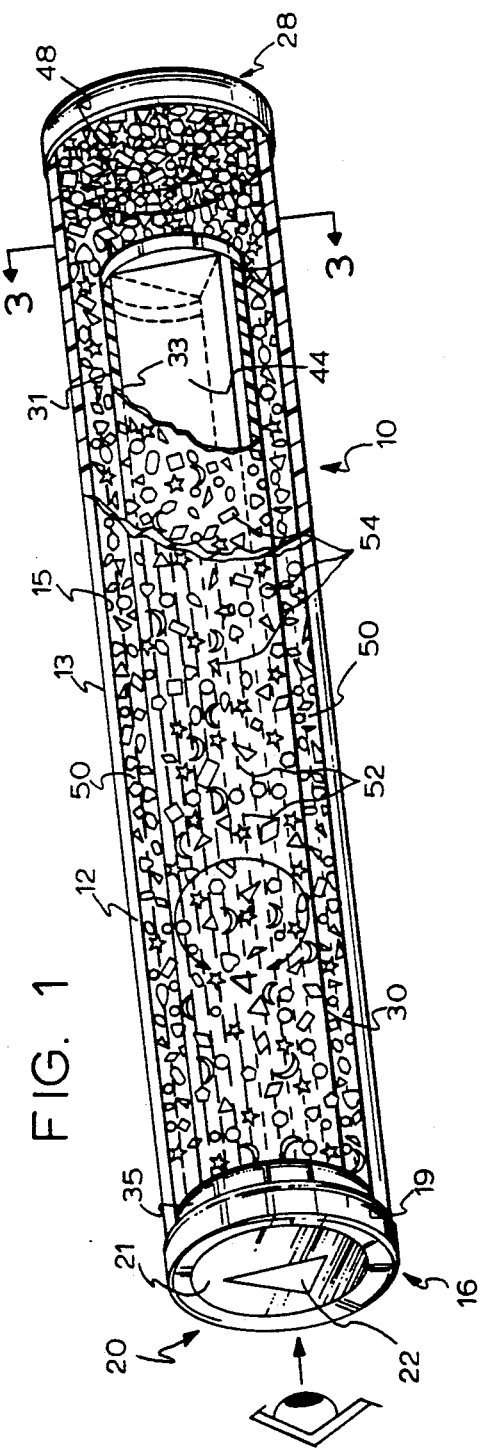

LIQUID FILLED KALEIDOSCOPE

FIELD OF THE INVENTION

The present invention relates generally to the field of amusement and optical devices and, more particularly, to a liquid filled kaleidoscope having a unique and novel dual housing construction for creating both an array of kaleidoscopic effects, which can be seen inside the kaleidoscope through the eyehole, and a kinetic decoration and entertaining optical illusion, which are visible from a vantage outside the kaleidoscope along its entire length.

DESCRIPTION OF THE PRIOR ART

The word kaleidoscope derives from the Greek meaning beautiful-form-to-see. The generally accepted definition of a kaleidoscope is a tube-like instrument containing loose bits and pieces that are reflected by mirrors to enable a variety of symmetrical patterns to appear as the instrument is rotated. A typical kaleidoscope includes an eye-piece, an object cell containing the objects to be viewed, a tube and either two or more mirrors angled towards each other and positioned along the length of the tube in alignment with the eye-piece. The angle of the mirrors determines the numbers and variety of the patterns. Two mirrors provide a reflection of the objects in the form of one image, centered and not multiplied. Three or more mirrors produce reflections of reflections so the pattern is duplicated to infinity. The pattern changes when the kaleidoscope or object cell is rotated or otherwise moved about. To create a brighter and more vibrant pattern in the object cell, it is often preferable to hold the kaleidoscope up to either natural or artificial light to enable the illumination of the objects reflected in the mirrors.

A great many kinds of kaleidoscopes have been designed over the years. There are brass scopes, wooden scopes, acrylic, ceramic, even gold-plated and sterling silver scopes. Sizes range from miniature to man-size. Object cells are filled with a wide variety of materials, including hand-blown glass ampules, sea shells, semi-precious stones, glass chips and baubles of all kinds. Several scopes have even received patent protection over the years. Those that are believed to be most germane to the present invention include the following: U.S. Pat. No. 4,740,046 to McCarthy, which discloses a kaleidoscope with an object cell that consists of one or more tubular sections containing channels (15) which direct the movement of the objects within certain confined areas. The objects are thus constrained to move within a restricted zone inside the object cell. U.S. Pat. No. 5,029,954 to Eilrich et al. shows a kaleidoscope having a self contained light source (28) and a removable fluid filled object tube (46) for viewing the colored particles therein (48-52). Again, the particles to be viewed are restricted to a specific and clearly defined area, in this case, the removable object tube. U.S. Pat. No. 3,748,013 to Orans discloses a kaleidoscope that contains a hollow fluid type container (16) freely carried within the object space (13) of the housing (11). The container (16) is filled with transparent liquid (17) which carries a plurality of color flake-like particles (18). The particles and the fluid are thus restricted to the distal end of the kaleidoscope. U.S. Pat. No. 3,039,356 to Knittel shows a kaleidoscope containing colored liquids (52) confined to a liquid tight chamber, which, like the previously mentioned devices, is located at the distal end of the scope. Once again, the liquid in the kaleidoscope is confined to the object cell and the number of individual particles therein is limited to the amount already inside. In none of the previous cases is the liquid inside the object cell allowed to penetrate into the main body. More importantly, these other devices do not enable the number of suspended particles in the object cell to be varied by the viewer by means of raising, lowering or rotating the distal end of the kaleidoscope, which also provides the further means for the particles to flow to and from the object cell and the main body.

Thus, there is a need for a kaleidoscope with a dual housing construction which allows the fluid and suspended particles to flow freely within the kaleidoscope housing to produce both kaleidoscopic images viewable inside the kaleidoscope through the eyehole and a kinetic decoration viewable from a vantage outside of the kaleidoscope along its entire length. This dual housing construction also provides the viewer with a means to increase or decrease the number of suspended particles that create the internal kaleidoscope image by raising or lowering the distal end of the kaleidoscope, which, in turn, causes the suspended particles to flow into and out of the object cell.

SUMMARY OF THE INVENTION

The present invention relates to a novel type of liquid filled kaleidoscope that offers first, the experience of viewing a multiplicity of brilliant and symmetrical patterns through the eyehole of the kaleidoscopic instrument and second, a kinetic decoration visible from a vantage outside the kaleidoscope along its entire length. Both these effects are created by the dispersion of particles suspended in liquid freely flowing throughout the body of the kaleidoscope against a color coordinated or some other aesthetically pleasing background. An optical illusion can also be created by the dispersion of the same particles against the backdrop of a reflective surface.

The invention contains a transparent elongated generally cylindrical shaped hollow main body ("cylinder") consisting of an opening at each end and an inner and outer sidewall extending the entire length of the cylinder. A cap is used to close off each end and seal the container to retain the liquid and the suspended particles inside. The cap at the distal end of the cylinder may be opaque, or even translucent or transparent to allow light to enter more easily and illuminate the particles flowing through the liquid in the object cell. The object cell is the area in the kaleidoscope that receives and displays a plurality of various sized particles, and is located at the distal end of the cylinder just inside the distal end cap. The cap at the proximal end of the device is normally opaque and includes a small opening in the approximate center to allow a person to view the vivid and interesting symmetrical patterns continuously developing inside the scope.

Inside and generally shorter in length than the cylinder is a transparent hollow inner casing, which is also generally tubular in shape though smaller in diameter than the cylinder. The inner casing extends from the end incorporating the eye-piece or viewing hole to a point just short of the distal cap of the cylinder. Covering the distal end of the inner casing is a cap, which is generally transparent. The proximal end of the inner casing is secured tightly inside the proximal end of the cylinder in direct alignment with the viewing hole. Inside the inner casing is an assembly of two or more mirrors arranged in angles relative to each other along the approximate length of the hollow portion to form a viewing channel. Mounted inside the inner casing and against the inner sidewall thereof is a means to hide or otherwise obfuscate the mirrors.

A liquid medium is introduced inside the hollow portion of the cylinder and is allowed to flow freely throughout the section ("outer chamber") consisting of the object cell and the adjoining area located between the inner wall of the cylinder and the outer wall of the casing. The suspended particles flowing freely throughout the liquid inside the outer chamber are reflected in the mirrors and result in a unique and interesting variety of duplicated symmetrical graphic patterns. A kinetic decoration and possible optical illusion is produced by the free flowing movement of these particles, particularly in the area adjoining the object cell, against the backdrop of the color coordinated or reflective material mounted inside the transparent inner casing.

Accordingly, it is the object of the present invention to provide a kaleidoscope that incorporates a unique and novel dual housing construction having a main cylinder and an inner casing that between them form an outer chamber into which a liquid medium and mass of free flowing individual particles of various sizes, shapes and colors are introduced.

Another object of the present invention is to provide a liquid filled kaleidoscope that includes an object cell containing a mass of individual particles suspended and moving in liquid that flows freely between the object cell and the adjoining area located between the inner casing and the interior wall of the transparent main cylinder.

Still another object of the present invention is to provide a liquid filled kaleidoscope that enables the viewer to observe both an array of interesting symmetrical images inside the kaleidoscope through the eyehole, and, from a vantage outside of the kaleidoscope, a kinetic decoration dispersed and visible along its entire length. The same suspended particles are involved in creating both such effects as they are caused to move relatively unrestricted between the object cell and the adjoining chamber.

Yet still another object of the present invention is to provide a liquid filled kaleidoscope with a dual housing construction to enable the number of suspended particles reflected in the mirrors to be varied by the viewer by means of raising or lowering the distal end of the kaleidoscope which, in turn, causes the suspended particles to flow to and from the object cell and the adjoining area located between the inner casing and the interior wall of the main cylinder.

Yet still another object of the present invention is to provide a liquid filled kaleidoscope utilizing a dual housing construction that is easy and cost effective to manufacture.

Other objects and advantages of the present invention will become apparent in the following specifications when considered in light of the attached drawings wherein a preferred embodiment of the invention is illustrated.

BRIEF DESCRIPTION OF THE DRAWINGS

FIG. 1 is a perspective view of a kaleidoscope in accordance with the present invention;

FIG. 2 is an exploded view of the kaleidoscope in accordance with the present invention;

DETAILED DESCRIPTION OF PREFERRED EMBODIMENT

Figure 3:
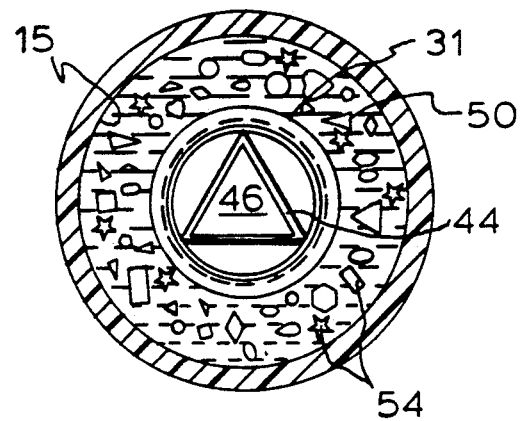
FIG. 3 is a cross-sectional view of the kaleidoscope in accordance with the present invention taken along line 3—3 of FIG. 1.
Figure 4:
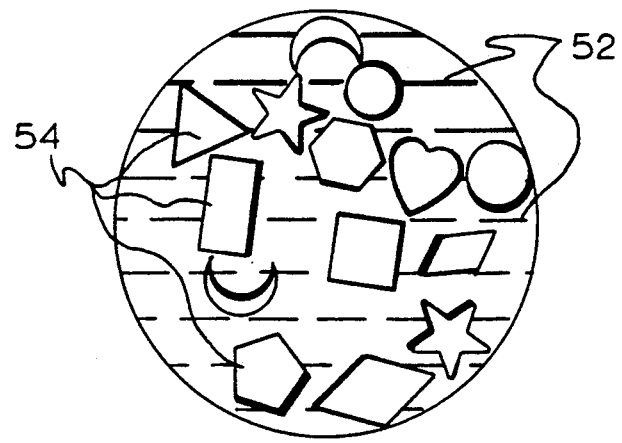
FIG. 4 is an enlarged section of FIG. 1 (see circular indicator with arrows) in accordance with the present invention.

Referring more particularly to the drawings, FIG. 1 is a perspective view of the present invention in its preferred form. A kaleidoscope 10 is shown having a transparent outer tubular body 12 with a hollow section 14 that consists of a proximal end 16, which includes a proximal end opening 18, and a distal end 24, which includes a distal end opening 26. Closing off the proximal end opening 18 is a proximal end cap 20, which includes a ferrule 19, i.e. a retaining ring or cap, and a disc 21 having respective diameters approximately the same as the diameter of opening 18. Disc 21 is placed over proximal end opening 18. Ferrule 19 is then placed over disc 21 and is secured tightly around the edges of proximal end 16. Closing off the distal end opening 26 is a distal end cap 28 comprising a ferrule 27 and a disc 29, which combine to securely close off distal end opening 26 in the same manner that end cap 20 performs the same function at the opposite end. Ferrule 27 and 29 have diameters that are approximately the same as the diameter of opening 26. The preferred material for the construction of the ferrules 19 and 27 is polished brass, though alternative materials and finishes may be utilized, as desired.

A viewing hole 22 is formed in the approximate center of proximal end cap 20. Viewing hole 22 can consist of an actual opening or aperture through the disc 21 or simply a transparent section of an otherwise opaque material painted black or some other color. Tubular body 12 also includes an outer wall 13 and an inner wall 15. The discs used to close off the ends of the outer tubular body 12 may be affixed to their respective openings by glue or some similar adhesive to enable them to form a tight seal through which the liquid cannot permeate. Discs 21 and 29 are normally black in color, though other colors and even transparent applications may be appropriate. The interior surface of disc 29 may be left transparent or painted white or some other color to provide a contrasting background for the images in the object cell, which is discussed below.

Inside the outer tubular body 12 is an inner tubular body 30 having a hollow section 32 with a proximal end 34 and a distal end 36. Just inside proximal end opening 18 is a mounting ring 35, which is sized specifically to receive proximal end 34 for firmly securing inner tubular body 30 within tubular body 12. Closing off distal end opening 38 is distal end cap 40, which is generally transparent. Inner tubular body 30 also includes an outer wall 31 and an inner wall 33. A colored reflective or non-reflective material 42 is applied and secured along the inner wall 33 to hide or otherwise obscure the mirrored contents of the inner tubular body 30. Material 42 can also function in other ways. For example, if applied in the form of a laser embossed mylar, it can reflect light and other images outwardly and through the transparent outer tubular body 12. If colored and non-reflective, material 42 can provide an attractive background effect, as will be explained more fully below.

Mounted inside the inner tubular body 30 is an assembly of mirrors 44 arranged at angles relative to each other along the approximate length of the hollow section 32 to form a viewing channel 46. At least two mirrors can be used in the kaleidoscope, though often three are preferred. The three mirrors are usually arranged in the form of either an isosceles or an equilateral triangle. For maximum clarity and generally the best image, aluminized front surface mirrors are preferred.

Viewing channel 46 is aligned with viewing hole 22. Defined within the area between distal end cap 24 and distal end cap 40 is the object cell 48; and adjoining object cell 48 are areas 50 comprising the zone between the inner wall 15 and the outer wall 31. The combination of the object cell 48 and the adjoining areas 50 are heretofore referred to as the "outer chamber". The liquid medium 52 may hold a variety of solid or other individual particles 54 in suspension and serves as a medium for permitting the free flow of the particles throughout the outer chamber. Liquid medium 52 is usually in the form of mineral oil, though other liquid media may be substituted, e.g. water, alcohol, or any blend of clear or colored oils that would allow effective suspension of the particles. The liquid is unable to permeate the hollow section 32 because of the tight seals formed at the distal and proximal ends 34 and 36.

The particles 54 suspended in the liquid 52 will typically vary in size, color and material in order to provide the most interesting patterns and over all enjoyable aesthetic presentation inside the kaleidoscope. The particles may be made from any appropriate material and will typically include, but will not be limited to, glitter, sparkles, small colored glass balls, and dye cut colored mylar geometric shapes. The number of the suspended particles 54 in the object cell 48 may be regulated by the viewer by means of raising or lowering the distal end of the kaleidoscope. When the kaleidoscope is rotated, inverted, shaken or agitated by the viewer, the suspended particles 54 are inclined to be dispersed and are allowed to move freely as individual components and/or in mass to and from the object cell and generally throughout the liquid medium filling the entire outer chamber.

The particles suspended in the liquid medium floating within the object cell 48 are reflected by the mirrors 44 to provide the kaleidoscopic effect of duplicated symmetrical patterns, which can be observed by looking through the viewing hole 22 into the interior of the scope. These same particles, dispersed and flowing freely within the liquid, also provide a unique kinetic decoration and/or optical illusion inside and along the entire length of the transparent outer chamber when viewed from a vantage outside of the kaleidoscope. Thus, for example, the transparent outer tubular body 12 may appear to be filled entirely with the liquid 52 in which there are suspended a plurality of solid particles 54 of various sizes, shapes and colors. When the kaleidoscope is shaken, rotated or inverted by the viewer and these particles disburse throughout the liquid medium in a suspended state, the effect is one which gives the impression that the entire hollow portion of the kaleidoscope is filled with liquid and the drifting particles. This near optical illusion can be enhanced by the use of a reflective laser embossed mylar or any similar material that is inserted inside the transparent inner tubular body 30. The mylar, in this case, acts to obscure the view of the mirrors in the inner tube by reflecting light and images away from it. In the process, the inner tube is inclined to blend in with the sparkles, glitter and other kinds of illumination typically given off by the suspended particles. The effect or illusion thus created can cause one to ponder how it is possible for the device to function as a kaleidoscope when there appears to be nothing inside the tube for housing the mirrors.

To embellish the aesthetic effect of the outer chamber in other ways and produce an interesting array of kinetic decorations, non-reflective color coordinated materials can be used in place of the reflective mylar. Various color options are available depending upon the background or overall effect desired.

The material of choice for the tubular bodies 12 and 30 is a clear acrylic plastic, though there are appropriate alternatives, such as glass, poly-vinyl chloride and polystyrene.

Although most people may have a preference for a kaleidoscope in the form of a cylinder or tube, which are known to be the most popular forms of the device, other shapes may be appropriate and, depending upon the mood of the market place, may even be more desirable. For example, the kaleidoscope can be made in the form of a sphere, triangle, hexagon, or octagon, to name only a few. Thus, one alternate embodiment includes a version of the present invention in the shape of a spherical "snow globe" paperweight, which would include a kaleidoscope viewable through the underside of the base portion of the device. The mirror assembly could be disguised, for example, as a snowman, house, or any other appropriate item that might be placed inside the sphere.

It is to be understood that the disclosed embodiments are merely exemplary of the invention, which may be embodied in various forms. Therefore, specific structural and functional details disclosed herein are not be interpreted as limiting, but merely as a basis for the claims and as a representative basis for teaching one skilled in the art to employ the present invention in virtually and appropriately detailed structure.

I claim:

1. A kaleidoscope filled with a liquid medium comprising:

a transparent elongated generally tubular body member consisting of a proximal end and a distal end, an opening at each said end, a hollow portion, an inner sidewall and an outer sidewall;

a first end cap for closing off the proximal end of said tubular body member with a viewing means therein;

a second end cap for closing off said distal end;

an elongated hollow generally tubular inner casing generally shorter than and located within the hollow portion of said tubular body member, said inner casing having an opening at the proximal end thereof, a generally transparent third end cap for closing off the distal end of said inner casing, an inner sidewall and an outer sidewall;

a means for connecting and securing the inner casing to the tubular body member;

an assembly of two or more mirrors arranged at angles relative to each other adapted to fit inside the hollow interior of said inner casing to form a viewing channel therein, said viewing channel being in alignment with said viewing means;

a means mounted inside said inner casing generally coincidental with the length of the entire said inner sidewall thereof for obscuring or hiding the mirror assembly;

a plurality of particles suspended and moving freely within the liquid medium;

an object cell defined by the space generally between the second end cap and the third end cap for receiving and displaying the particles that are reflected in the mirrors; and a chamber that adjoins the object cell and comprises the area between the inner wall of said tubular body and the outer wall of said inner casing, said chamber being coactive with said object cell to allow therein the unrestricted movement of the liquid medium and the free flow of individual particles for providing the means to create, in a generally simultaneous time frame, one or more duplicated symmetrical patterns, viewable inside the kaleidoscope through the eyehole, and a kinetic decoration, visible from a vantage outside the kaleidoscope along its entire length.

2. The invention of claim 1 wherein said suspended particles comprise a mass of individual objects susceptible to changing patterns in the object cell as the viewer rotates, inverts, shakes or agitates the tubular body.

3. The invention of claim 1 wherein the number of suspended particles seen reflected in the mirrors can be varied by the viewer by means of raising or lowering the distal end of the tubular body to cause the particles to flow to and from the object cell and the adjoining chamber.

4. The invention of claim 1 wherein the connecting means comprises a mounting ring with an outer diameter approximately the same size as the interior diameter of the tubular body and an inner diameter approximately the same size as the exterior diameter of the inner casing.

5. The invention of claim 1 wherein the suspended particles comprise objects of any geometric or pictoral shape appropriate in size for accommodation within the area consisting of the adjoining chamber and object cell of the kaleidoscope.

6. The invention of claim 1 wherein the suspended particles comprise an array of objects of various colors.

7. The invention of claim 1 wherein the liquid medium is capable of holding said particles in suspension.

8. The invention of claim 1 wherein the composition of the liquid medium is mineral oil, water or alcohol.

9. The invention of claim 1 wherein the means mounted inside the inner casing comprises a reflective covering, said covering adapted to reflect light and images away from the inner casing and through the liquid medium to be viewed from a vantage outside the kaleidoscope.

10. The invention of claim 1 wherein the means mounted inside the inner casing comprises a colored covering.

11. The invention of claim 1 wherein said kinetic decoration comprises a plurality of suspended particles disbursed throughout the adjoining chamber against the backdrop of the colored covering.

12. The invention of claim 9 comprising a means for creating an optical illusion, said means consisting of the particles suspended against the backdrop of the reflective covering to create the visual deception that there are no mirrors inside the tubular body.

13. The invention of claim 1 wherein the viewing means comprises a generally transparent opening in the first end cap surrounded by an opaque surface.

14. The invention of claim wherein said opaque surface is generally dark in color.

15. The invention of claim 1 wherein the first end cap and second end cap are opaque.

16. The invention of claim 1 wherein the first end cap and second end cap are transparent.

* * * * *

UNITED STATES PATENT AND TRADEMARK OFFICE
CERTIFICATE OF CORRECTION

PATENT NO. : 5,132,844
DATED : July 21, 1992
INVENTOR(S) : Evert Sharp, Jr.

It is certified that error appears in the above-identified patent and that said Letters Patent is hereby corrected as shown below:

Column 8, Line 33:

add "1".

should read "14. The invention of Claim 1 wherein said opaque surface is generally dark in color."

Signed and Sealed this

Twenty-fourth Day of August, 1993

Attest:

BRUCE LEHMAN

Attesting Officer      Commissioner of Patents and Trademarks